US011440119B2

(12) United States Patent
Chang et al.

(10) Patent No.: US 11,440,119 B2
(45) Date of Patent: Sep. 13, 2022

(54) SYSTEM AND METHOD FOR WELD PATH GENERATION

(71) Applicant: Teradyne, Inc., North Reading, MA (US)

(72) Inventors: Chu-Yin Chang, Reading, MA (US); Brett L. Limone, Danvers, MA (US); Ralph F. Polimeni, Jr., Reno, NV (US); James D. English, Alva, FL (US)

(73) Assignee: Teradyne, Inc., North Reading, MA (US)

(*) Notice: Subject to any disclaimer, the term of this patent is extended or adjusted under 35 U.S.C. 154(b) by 149 days.

(21) Appl. No.: 16/159,197

(22) Filed: Oct. 12, 2018

(65) Prior Publication Data

US 2020/0114449 A1    Apr. 16, 2020

(51) Int. Cl.
   *B23K 9/095* (2006.01)
   *B25J 9/16* (2006.01)
   *B23K 9/12* (2006.01)

(52) U.S. Cl.
   CPC .......... *B23K 9/0956* (2013.01); *B23K 9/0953* (2013.01); *B23K 9/12* (2013.01); *B25J 9/1664* (2013.01); *B25J 9/1684* (2013.01)

(58) Field of Classification Search
   CPC ...... B23K 9/0953; B23K 9/0956; B23K 9/12; B23K 9/1274; B23K 9/32; E04G 21/243;
   (Continued)

(56) References Cited

U.S. PATENT DOCUMENTS 5,999,642 A    12/1999  Gilliland
2008/0125893 A1*  5/2008  Tilove ................... B25J 9/1666
                                                    700/103
(Continued)

FOREIGN PATENT DOCUMENTS

CN    102521835 A  *  6/2012
CN    102592284 A  *  7/2012
(Continued)

OTHER PUBLICATIONS

Energid, "Generating Automated Tool Paths for Robotic Welding and Cutting Applications", Jan. 31, 2018, https://youtu.be/BRG2_LKFiSM (Year: 2018).*

(Continued)

*Primary Examiner* — Justin C Dodson
*Assistant Examiner* — Dilnessa B Belay
(74) *Attorney, Agent, or Firm* — Mark H. Whittenberger, Esq.; Holland & Knight LLP

(57) ABSTRACT

Embodiments of the present disclosure are directed towards a robotic system and method. The system may include a robot and a three dimensional sensor device associated with the robot configured to scan a welding area and generate a scanned welding area. The system may include a processor configured to receive the scanned welding area and to generate a three dimensional point cloud based upon, at least in part the scanned welding area. The processor may be further configured to perform processing on the three dimensional point cloud in a two-dimensional domain. The processor may be further configured to generate one or more three dimensional welding paths and to simulate the one or more three dimensional welding paths.

14 Claims, 16 Drawing Sheets

(58) Field of Classification Search
CPC .. F23R 3/14; F23R 3/283; F23R 3/286; F23R 3/34; F23R 3/343; Y02T 50/675
See application file for complete search history.

(56) References Cited

U.S. PATENT DOCUMENTS

| | | |
|---|---|---|
| 2010/0152870 A1 | 6/2010 | Wanner et al. |
| 2016/0059415 A1* | 3/2016 | Guerin ................... B25J 13/00 901/4 |
| 2018/0065204 A1* | 3/2018 | Burrows ................ B25J 11/007 |

FOREIGN PATENT DOCUMENTS

| | | | |
|---|---|---|---|
| CN | 104400265 A1 | | 3/2015 |
| CN | 106141374 A | | 11/2016 |
| CN | 104400265 B | * | 6/2017 |
| CN | 107931830 A | | 4/2018 |
| EP | 1188510 A2 | | 3/2002 |
| JP | 11077308 A | | 3/1999 |
| JP | 2005271103 A | | 10/2005 |
| WO | 2013074153 A1 | | 5/2013 |

OTHER PUBLICATIONS

International Search Report and Written Opinion of the International Searching Authority in counterpart International PCT Application No. PCT/US2019/055353 dated Jan. 21, 2020.

\* cited by examiner

900

SYSTEM AND METHOD FOR WELD PATH GENERATION

TECHNICAL FIELD

The invention generally relates to robotics and more specifically to a system and method for generating a weld path.

BACKGROUND

Robots and robotic systems are being used in more and more industrial applications. For example, robots have been used to assist in numerous welding tasks. These types of systems generally require a computer aided design ("CAD") model in order to generate the most accurate and efficient welding path. These existing systems are also directed towards scanning a particular area of a part and do not scan the entire possible welding area.

SUMMARY

In one or more embodiments of the present disclosure, a system is provided. The system may include a robot and one or more three dimensional sensor devices associated with the robot configured to scan a welding area and generate a scanned welding area. The system may further include one or more processors configured to receive the scanned welding area and to generate a three dimensional point cloud based upon, at least in part the scanned welding area, the one or more processors further configured to perform processing on the three dimensional point cloud in a two-dimensional domain, the one or more processors further configured to generate one or more three dimensional welding paths and to simulate the one or more three dimensional welding paths.

One or more of the following features may be included. Processing the three-dimensional point cloud in a two-dimensional domain may include at least one of binary image thinning of a welding path or smoothing a welding path based upon, at least in part, a moving average filter. Processing the three-dimensional point cloud in a two-dimensional domain may also include analysis of one or more environmental or robot constraints. Simulating the one or more three dimensional welding paths may include verifying feasibility of the one or more three dimensional welding paths. If the one or more three dimensional welding paths are not verified, the one or more processors may be further configured to re-simulate after altering a position of a welding table or a welding part. Performing processing on the three dimensional point cloud in a two-dimensional domain may include converting the three dimensional point cloud to a height field. Performing processing on the three dimensional point cloud in a two-dimensional domain may include applying a local minimum filter to the height field. Binary image thinning may include removing one or more branch nodes, wherein a branch node corresponds to a pixel having more than two neighbors. The system may further include a graphical user interface configured to allow a user to select a filter size, select a point cloud for processing, visualize a weld path result or save the one or more three-dimensional welding paths. The system may use one or more processors to maintain a welding formation with respect to gravity as a welding process is being performed. Maintaining the welding formation may be based upon, at least in part, one or more extra degrees of freedom associated with the robot.

In another embodiment of the present disclosure, a method is provided. The method may include providing a robot and scanning a welding area using one or more three dimensional sensor devices associated with the robot to generate a scanned welding area. The method may further include receiving the scanned welding area at one or more processors and generating a three dimensional point cloud based upon, at least in part the scanned welding area. The method may also include processing the three dimensional point cloud in a two-dimensional domain to generate one or more three dimensional welding paths and simulating the one or more three dimensional welding paths.

One or more of the following features may be included. Processing the three-dimensional point cloud in a two-dimensional domain may include at least one of binary image thinning of a welding path or smoothing a welding path based upon, at least in part, a moving average filter. Processing the three-dimensional point cloud in a two-dimensional domain may also include analysis of one or more environmental or robot constraints. Simulating the one or more three dimensional welding paths may include verifying feasibility of the one or more three dimensional welding paths. If the one or more three dimensional welding paths are not verified, the one or more processors may be further configured to re-simulate after altering a position of a welding table or a welding part. Performing processing on the three dimensional point cloud in a two-dimensional domain may include converting the three dimensional point cloud to a height field. Performing processing on the three dimensional point cloud in a two-dimensional domain may include applying a local minimum filter to the height field. Binary image thinning may include removing one or more branch nodes, wherein a branch node corresponds to a pixel having more than two neighbors. The method may allow a user to select a filter size, select a point cloud for processing, visualize a weld path result or save the one or more three-dimensional welding paths. The method may include using one or more processors to maintain a welding formation with respect to gravity as a welding process is being performed wherein maintaining the welding formation is based upon, at least in part, one or more extra degrees of freedom associated with the robot.

BRIEF DESCRIPTION OF THE DRAWINGS

For a better understanding of the nature and objects of the present disclosure, reference is made to the following detailed description taken in conjunction with the following drawings, in which.

DETAILED DESCRIPTION

Embodiments of the subject application may include concepts from U.S. Pat. Nos. 6,757,587, 7,680,300, 8,301,421, 8,408,918, 8,428,781, 9,357,708, U.S. Publication No. 2015/0199458, U.S. Publication No. 2016/0321381, and U.S. Publication No. 2018/0060459, the entire contents of each are incorporated herein by reference in their entirety.

Figure 1:
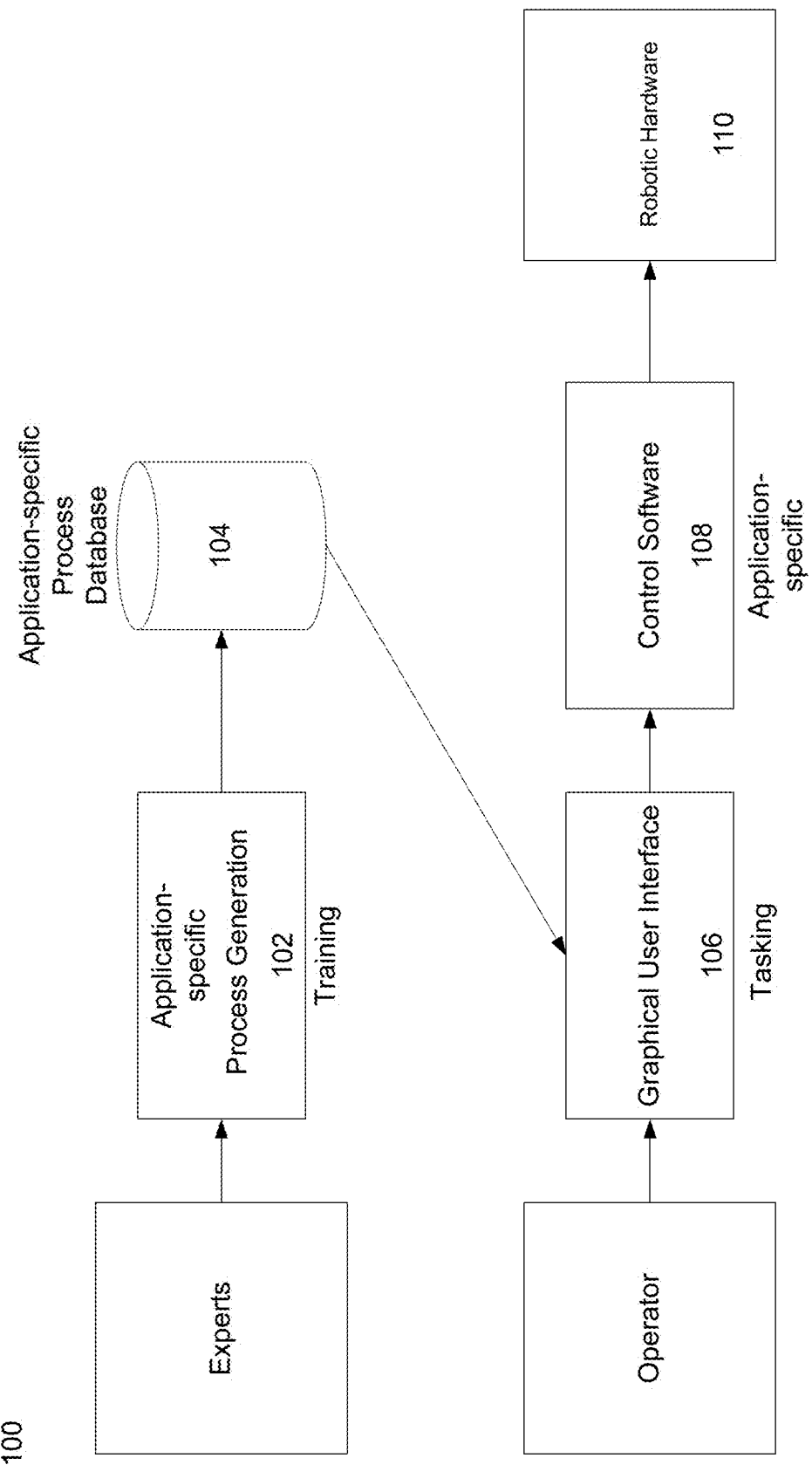
FIG. 1 is a block diagram of a weld path generation robotic system, according to an embodiment of the present disclosure.

Referring now to FIG. 1, an embodiment of a robotic system 100 for use in generation of one or more welding paths is provided. System 100 may include a plurality of components, portions of which may be designed for a particular application and/or task. The first component of the system may include a software system 102 for adding new processes to a database 104. Once built, database 104 may be reused by operators in the field or remotely. Operators may select an element from the database 104 using a graphical user interface 106 for execution by the control software 108 as is shown in FIG. 1. Procedures for the particular application and/or task (e.g. welding, robotic assembly, etc.) may be added to database 104 by experts offline. This database 104 may be used with a graphical user interface 106 and tasking software online to develop each procedure for each task. The software modules may include, but are not limited to training, tasking, and performance of the particular task, etc. All of this may be used to control the manner of operation of robotic hardware 110. Robotic hardware 110 may respond to the controls received from control software 108 and may include one or more sensing devices, scanners, and/or other various devices as is discussed in further detail hereinbelow.

In a robotic system, the phrase "degrees of freedom" may refer to specific, defined modes in which a mechanical device or system can move. The number of degrees of freedom may be equal to the total number of independent displacements or aspects of motion. For example, a six degrees of freedom ("6DOF") scenario may refer to the freedom of movement of a rigid body in three-dimensional space. Specifically, the body may be free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). In contrast, placing a point in space may correspond three degrees of freedom, specifying a distance between two points on different links is one degree of freedom, etc.

In some embodiments, the phrase "robotic system", as used herein, may include a system of one, two, and/or any number of robots. In this way, an entire robotic system DOF may refer to the sum of the DOFs on each of the individual robots. This may include one DOF for each single-axis joint, and six DOF for a free-moving base. For example, for a robotic system that includes two robots, one having 6DOF and the other having 5DOF, the available entire robotic system degrees of freedom may be 11DOF.

Figure 2:
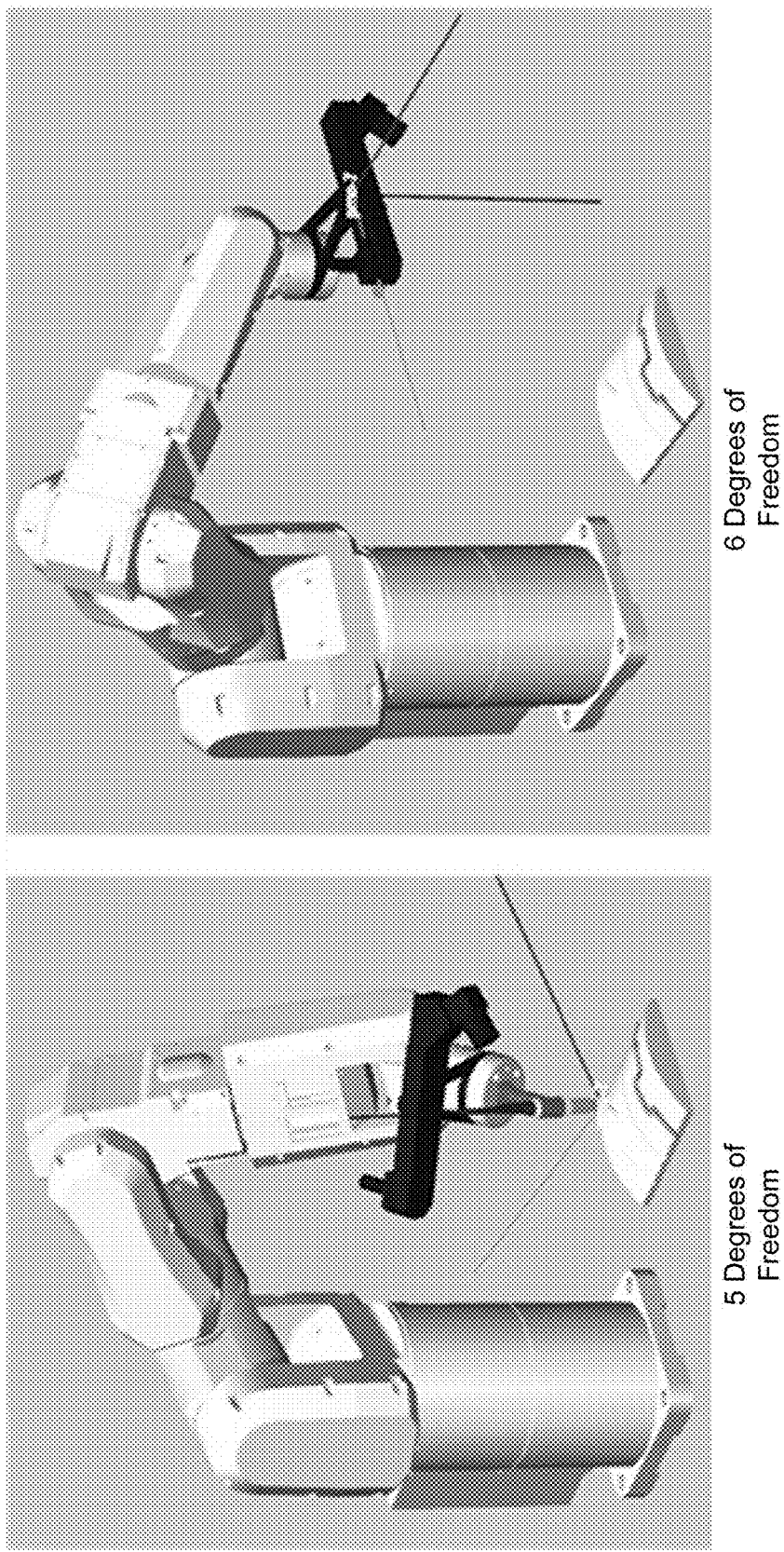
FIG. 2 is a graphical user interface showing multiple degrees of freedom of a weld path generation robotic system, according to an embodiment of the present disclosure.

For example, and referring now to FIG. 2, a 3D rendering from a graphical user interface 200 depicting a welding tool having five degrees of freedom contrasted with a welding tool having six degrees of freedom, full 3D rotation and orientation, is provided. The difference between the two is the five degrees of freedom may be found by relaxing rotation about one axis. This particular model was tuned to optimize a scan and weld process. This involved configuring the bounding volumes around the scanner tool, as well as aligning the system and base primary frames to make the tool paths and point clouds appear in the correct locations. The tool offsets were also configured based on how the tool paths were created from the point clouds. The paths were created along the bottom of the seams, so an offset from the tip was configured so there were no collisions. As shown in FIG. 2, the arm may be constrained using two different constraint sets, with each one using a different tool offset, one for scanning the part and one for welding. The degrees of freedom set for scanning uses a six degree of freedom frame, and the welding set uses a five degree of freedom frame that allows the tip of the torch to freely rotate around the tip. This allows scanning for the part first, then relaxing of the degrees of freedom for the weld paths, which are more difficult for the robot to achieve given its workspace envelope.

Figure 3:
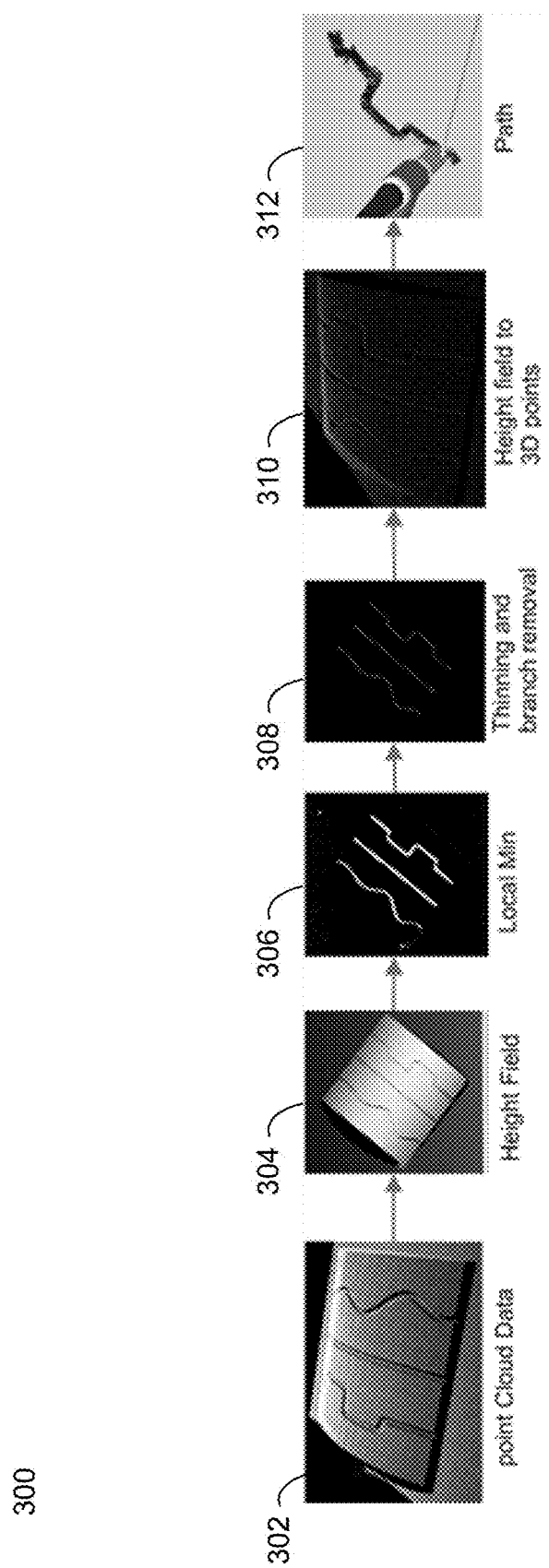
FIG. 3 is a flowchart of a weld path generation robotic method, according to an embodiment of the present disclosure.

In some embodiments, and referring now to FIG. 3, an embodiment depicting a flowchart having a number of operations consistent with a weld path generation process is provided. As will be discussed in further detail below, weld path generation process 10 may include scanning a welding area and generating 302 point cloud data. The process may further include converting 304 the point cloud data to a height field and applying 306 a local minimum filter. The process may also include performing 308 binary image thinning and branch removal. The established height field may be converted 310 back to a three dimensional space prior to simulation 312.

Figure 4:
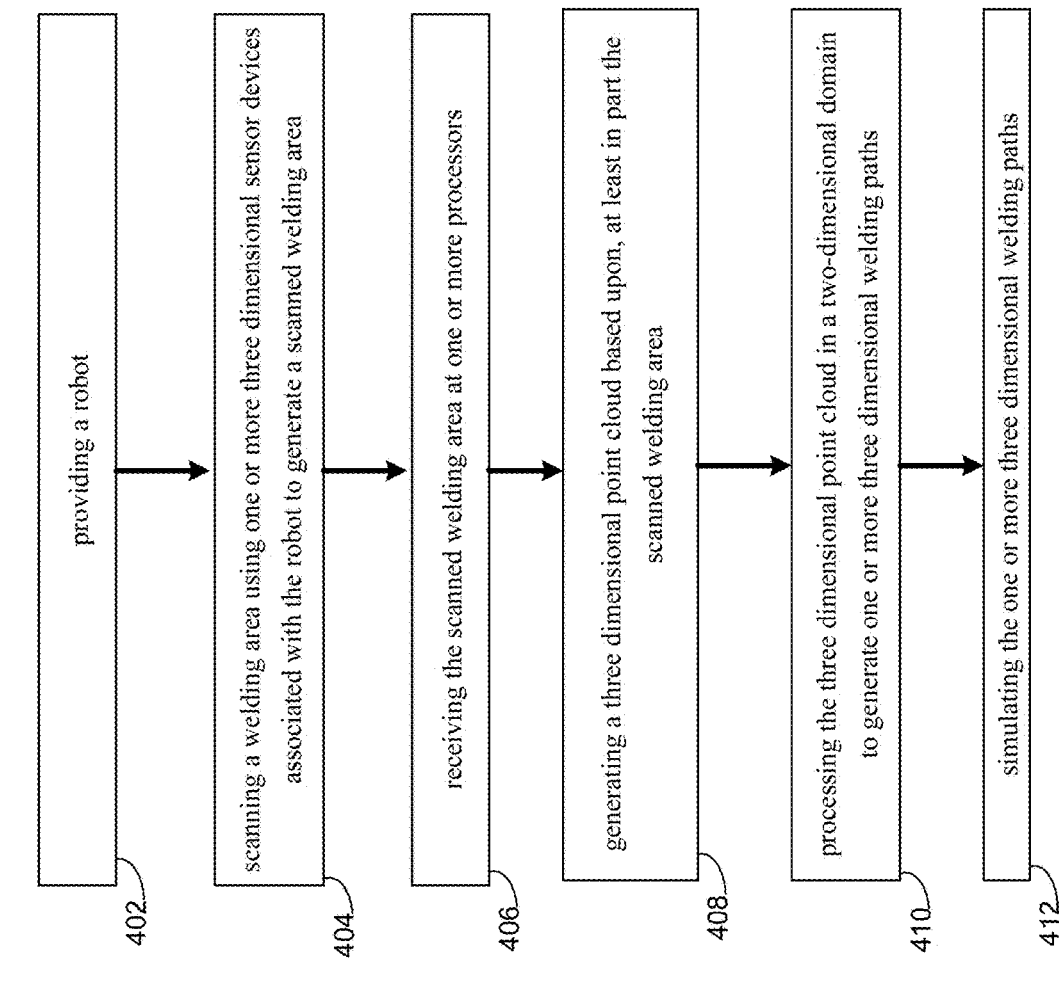
FIG. 4 is another flowchart of a weld path generation robotic method, according to an embodiment of the present disclosure.

In some embodiments, and referring now to FIG. 4, another embodiment consistent with a weld path generation process is provided. The method may include providing 402 one or more robots or robotic systems and scanning 404 a welding area using one or more three dimensional sensor devices associated with the one or more robots to generate a scanned welding area. The system may include a processor configured to receive 406 the scanned welding area and to generate 408 a three dimensional point cloud based upon, at least in part the scanned welding area. The processor may be further configured to perform processing 410 on the three dimensional point cloud in a two-dimensional domain. The processor may be further configured to generate one or more three dimensional welding paths and to simulate 412 the one or more three dimensional welding paths.

Figure 5:
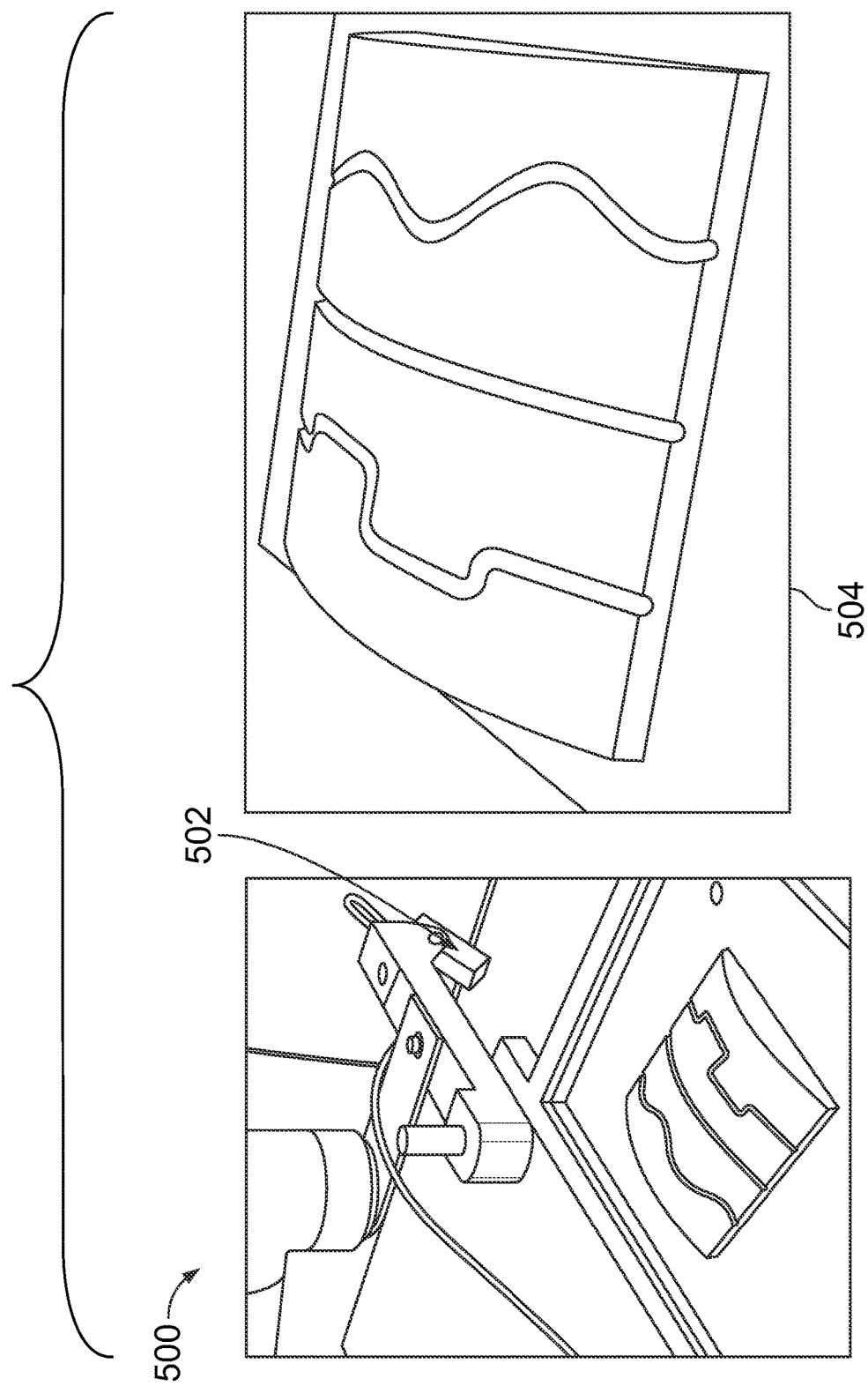
FIG. 5 is a diagram showing aspects of a weld path generation robotic method, according to an embodiment of the present disclosure.

Referring now to FIG. 5, a diagram 500 showing an embodiment consistent with weld path generation process is provided. Diagram 500 depicts an example of laser scanning and subsequent weld path generation. In some embodiments, a laser line scanner 502 may be used to pre-scan the welding area. In this particular example, scanner 502 may be mounted to the end of a robotic system. Weld path generation process may calculate the weld path and volume and provide that information as an input to the on-line process as is discussed below. The right portion of diagram 500 shows the resulting point cloud 504 that may be generated using this particular approach, here, having a resolution of 0.2 mm.

Figure 6:
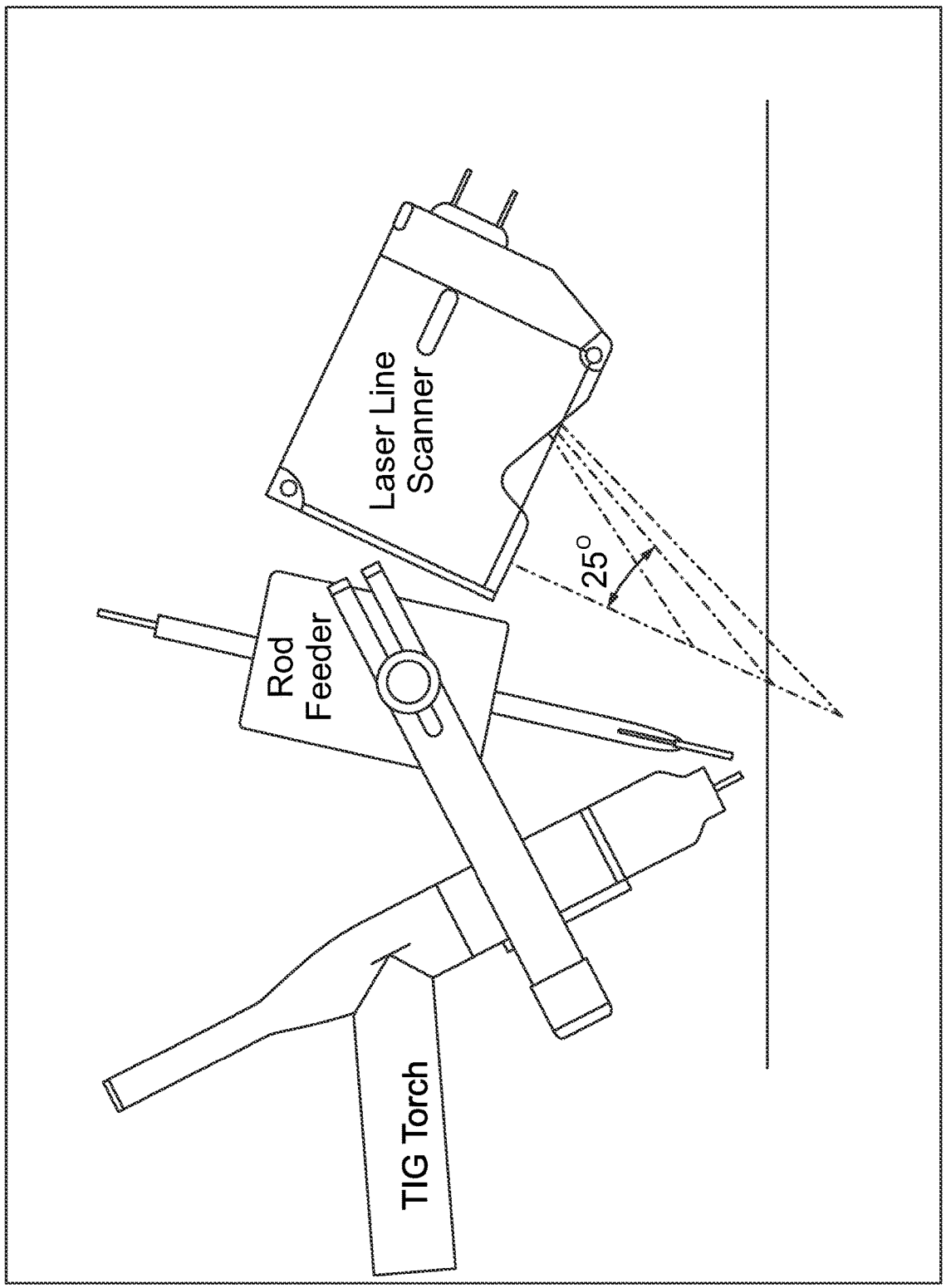
FIG. 6 is a scanner for use with a weld path generation robotic method, according to an embodiment of the present disclosure.

Referring now to FIG. 6, an example of a scanning system 600 that may be used in accordance with weld path generation process is provided. For example, a laser line scanner may be used for both pre-scanning the welding area and also for on-line weld groove tracking. The laser line scanner may be mounted on the end effector of the robot and may be positioned to look a few centimeters ahead of the welding area to avoid the any light. It may be used to correct any weld path deviation away from the pre-scanned data.

As shown in FIG. 6, laser line scanner 602 may be configured to operate in conjunction with a TIG torch 604 and rod feeder 606. This scanning system is provided merely by way of example as numerous scanners may be used in accordance with weld path generation process. For example, either two dimensional visible sensor or thermal sensors may be used to monitor the welding process. As such, the visible sensor may be used to record the entire process. The thermal information can be used to prevent overheating of the surrounding area. One related aspect of TIG welding involves keeping the filler rod in the puddle. This may be monitored using a conductivity sensor to sense the conductivity between the filler rod and the metal. When the filler rod is in the puddle, the rod and the metal are conducted, otherwise it is an open loop. To prevent over feeding the filler rod, the feeding force may be monitored. If the filler rod was fed too quickly, it may hit the metal and the force may increase. By monitoring the feeding force via a force sensor and the conductivity between the filler rod and the metal, the filler rod can be maintained in the puddle.

In some embodiments, scanner 502, 602 may be configured to pre-scan the area and find the weld path for offline planning and seam tracking for use in an online process. During the pre-scanning process, the robot or robotic system may be used to move the laser scanner linearly and collect points for the point cloud. The resolution of the scanning may be user specified and in this case, a 0.25 mm spacing was used.

In some embodiments, weld path generation process may be configured to create a weld path from the point cloud. For example, the point cloud may be converted to a height field. Then points that are local minimums may be identified. This may be followed by a thinning process and branch removal so the path becomes well defined. The point on the path may be used to calculate a path with normal and tangent defined.

Figure 7:
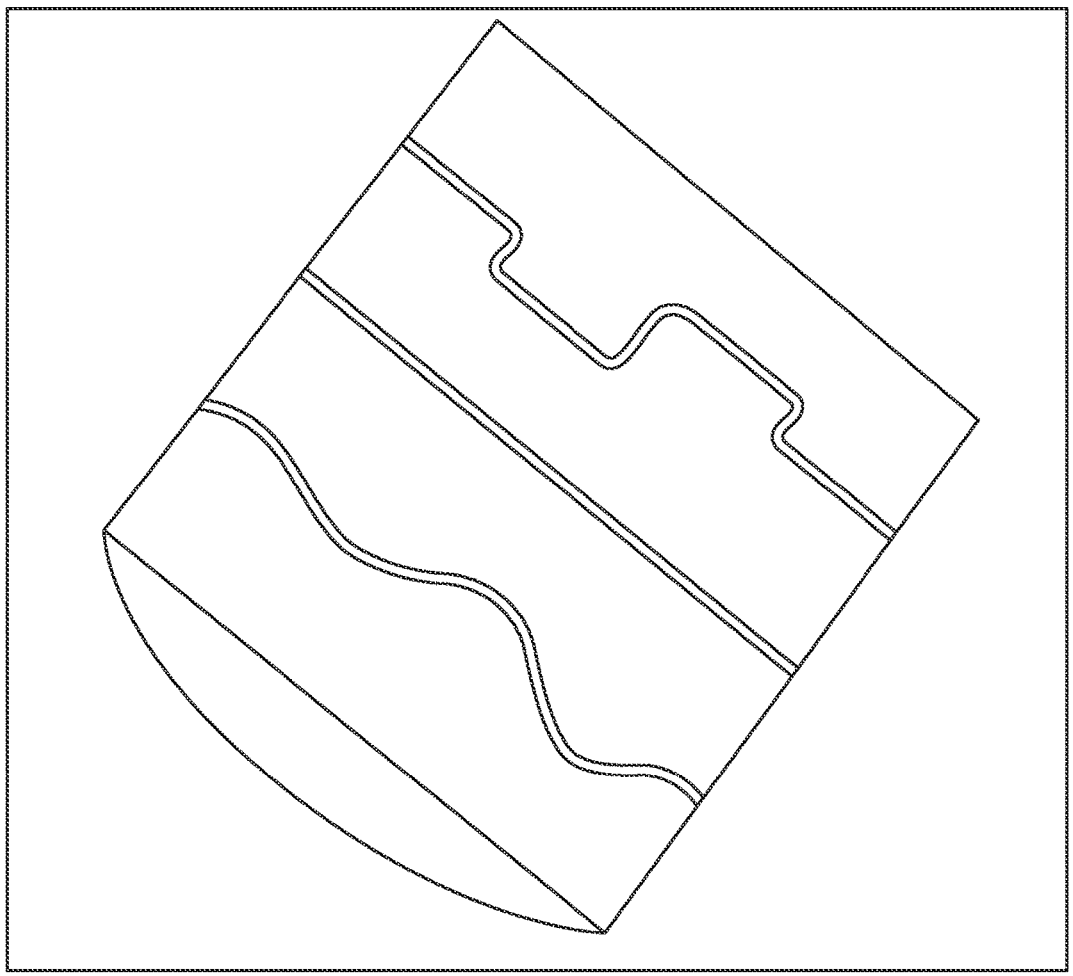
FIG. 7 is a diagram showing aspects of a weld path generation robotic method, according to an embodiment of the present disclosure.

Referring now to FIG. 7, an example showing a conversion from a three dimensional point cloud to a height field is provided. In this particular example, converting from the point cloud to the height field may be fairly efficient. The point cloud may be converted to a two dimensional array with the height as the value in the entries of the array. In this case the resolution of the grids may be 0.5 mm and, accordingly, the resulting array size is 506×451. This approach may work well for most cases if the weld path is visible from one side. The data is essentially converted into a two dimensional image and sent to an image processing tool. In situations where the weld path may not be visible from one side, such as welding to join two pipes, a different scanning pattern may be needed.

Figure 8:
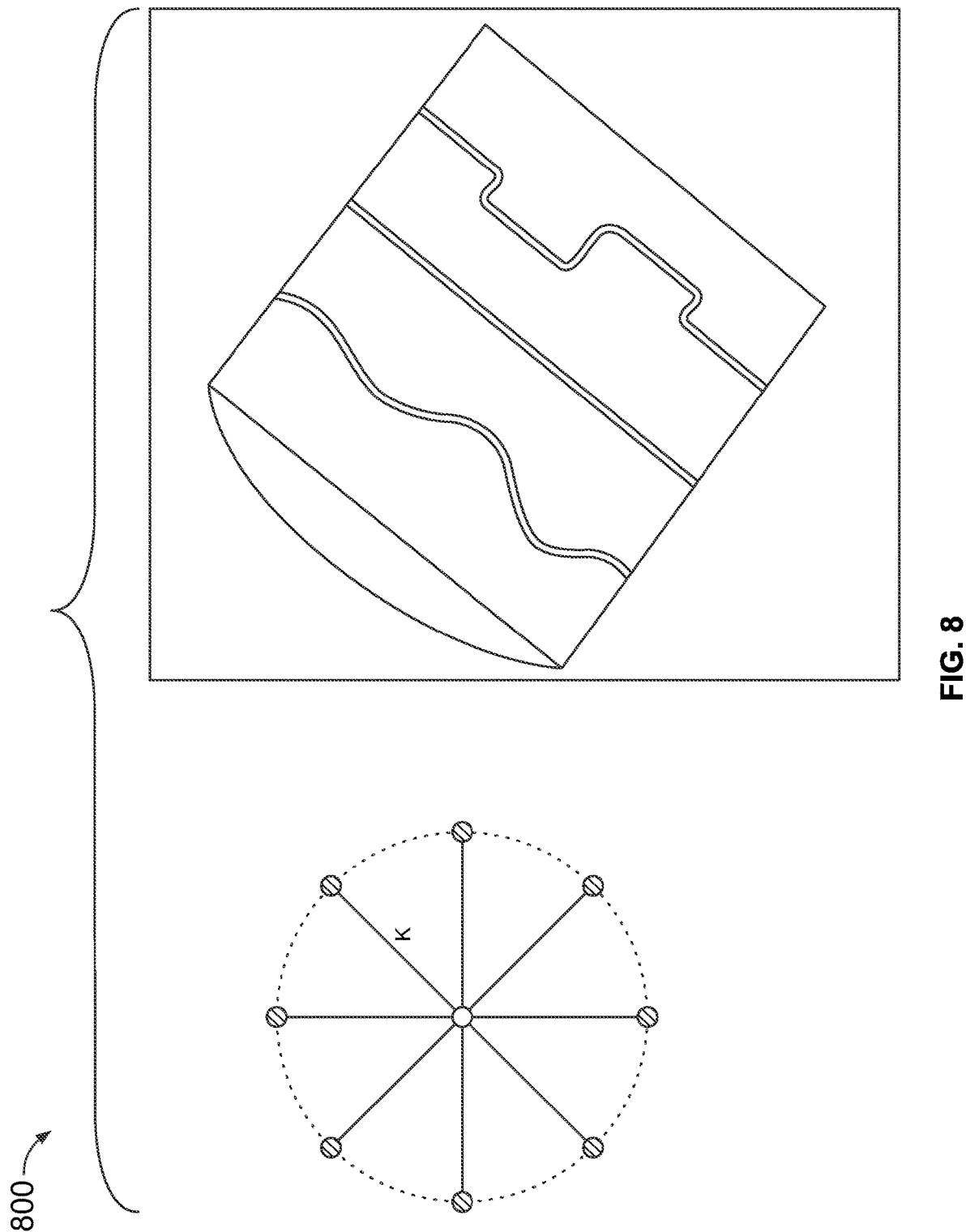
FIG. 8 is a diagram showing aspects of a weld path generation robotic method, according to an embodiment of the present disclosure.
Figure 9:
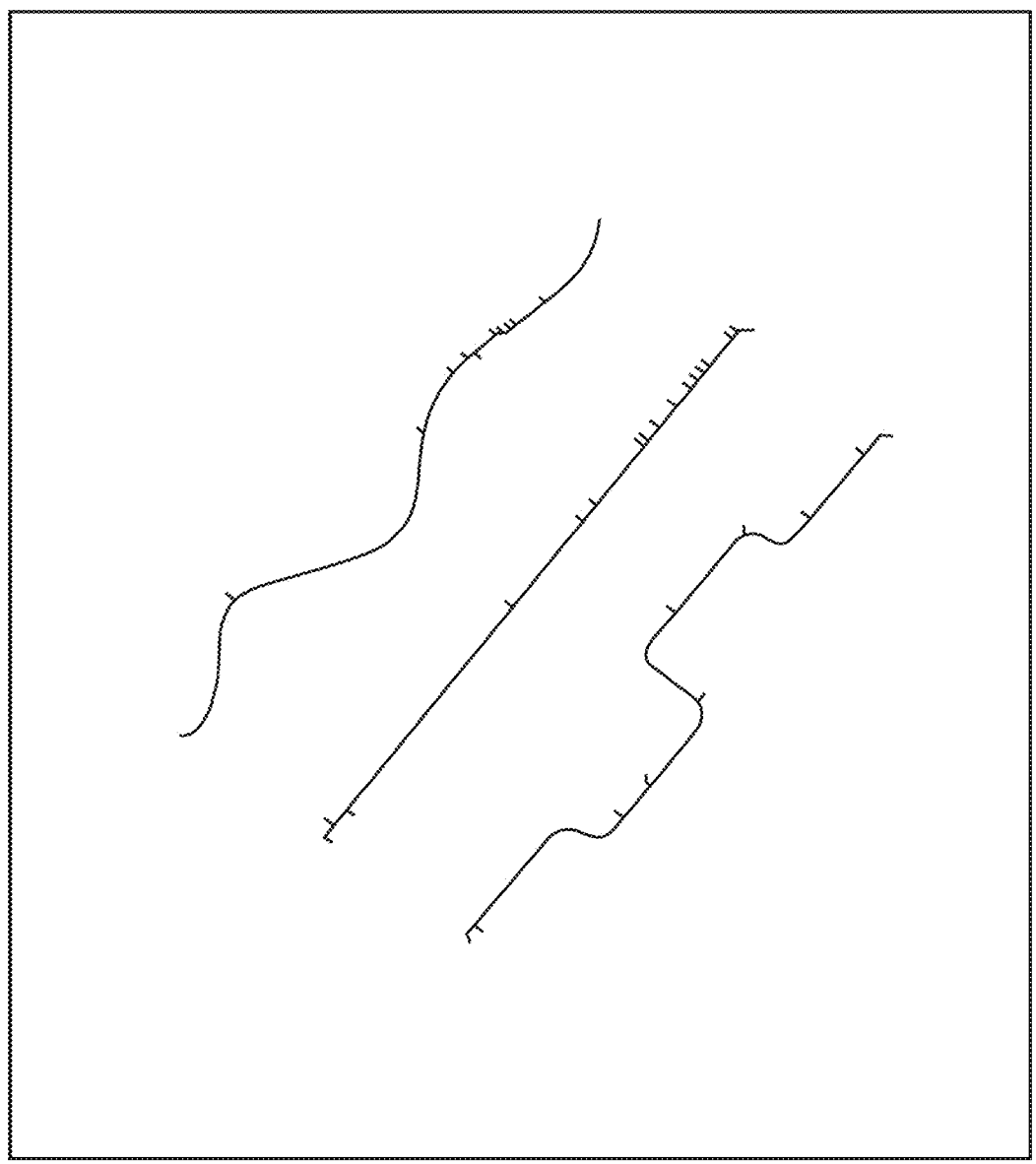
FIG. 9 is a diagram showing aspects of a weld path generation robotic method, according to an embodiment of the present disclosure.

Referring now to FIG. 8, an example showing a local minimum filter being applied to the height field two dimensional array is provided. The result is shown as a binary image. As discussed above, and in order to identify the seam in the scanned data, a local minimum filter may be applied. Given the kernel size k, number of angles and threshold t, the filter may traverse through all of the points on the two dimensional array to see if the height difference from the center of the kernel to the edge exceeds the threshold. FIGS. 8-9 show an example with k=10, number of angle=8 and threshold=1.25 mm. It can be seen that this is a fairly effective filter to select the local minimum from scanned data. The only drawback is that the resulting weld path is relatively thick.

Figure 10:
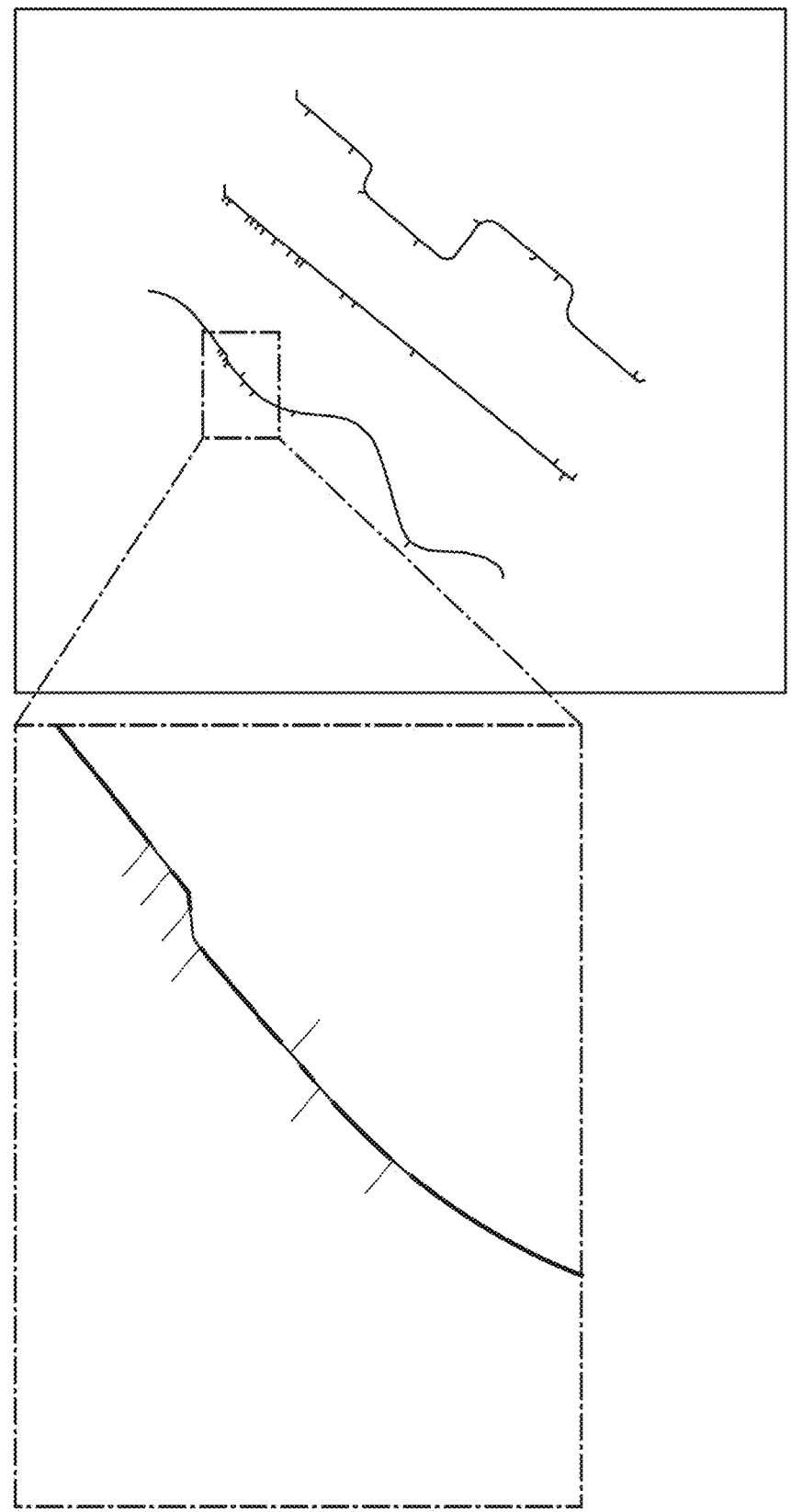
FIG. 10 is a diagram showing aspects of a weld path generation robotic method, according to an embodiment of the present disclosure.

In some embodiments, weld path generation process may utilize binary image thinning techniques for reducing the thickness of a region without changing the length. In contrast, image erosion, or dilation may end up changing the width and length at the same time. In this particular example, the end result of the thinning process provides regions of the image having a width of one pixel. As can be seen from FIG. 10, the resulting image blocks may not be ready to be used as welding paths, there are branches in the region that need to be removed.

In some embodiments, and with regard to branch removal, the goal is to have each image block include two leaf nodes and no branch node. As used herein, a leaf node is referred to as a pixel that has only one neighbor. A branch node is referred to as a pixel having more than two neighbors. The branch removal process may include, but is not limited to, creating a neighbor map, which registers each pixel with a code indicating the presence of the 8 neighbors. This also creates a list of the leaf nodes and a list of the branch nodes. The branch removal process may then traverse through all leaf nodes, removing branches that are shorter than a predefined threshold. The branch removal process further includes updating the neighbor map and visiting all of the branch nodes and removing the ones that do not affect connectivity. The process may then apply the thinning methodology and proceed back to the creation of the neighbor map operation until the image stops changing.

Figure 11:
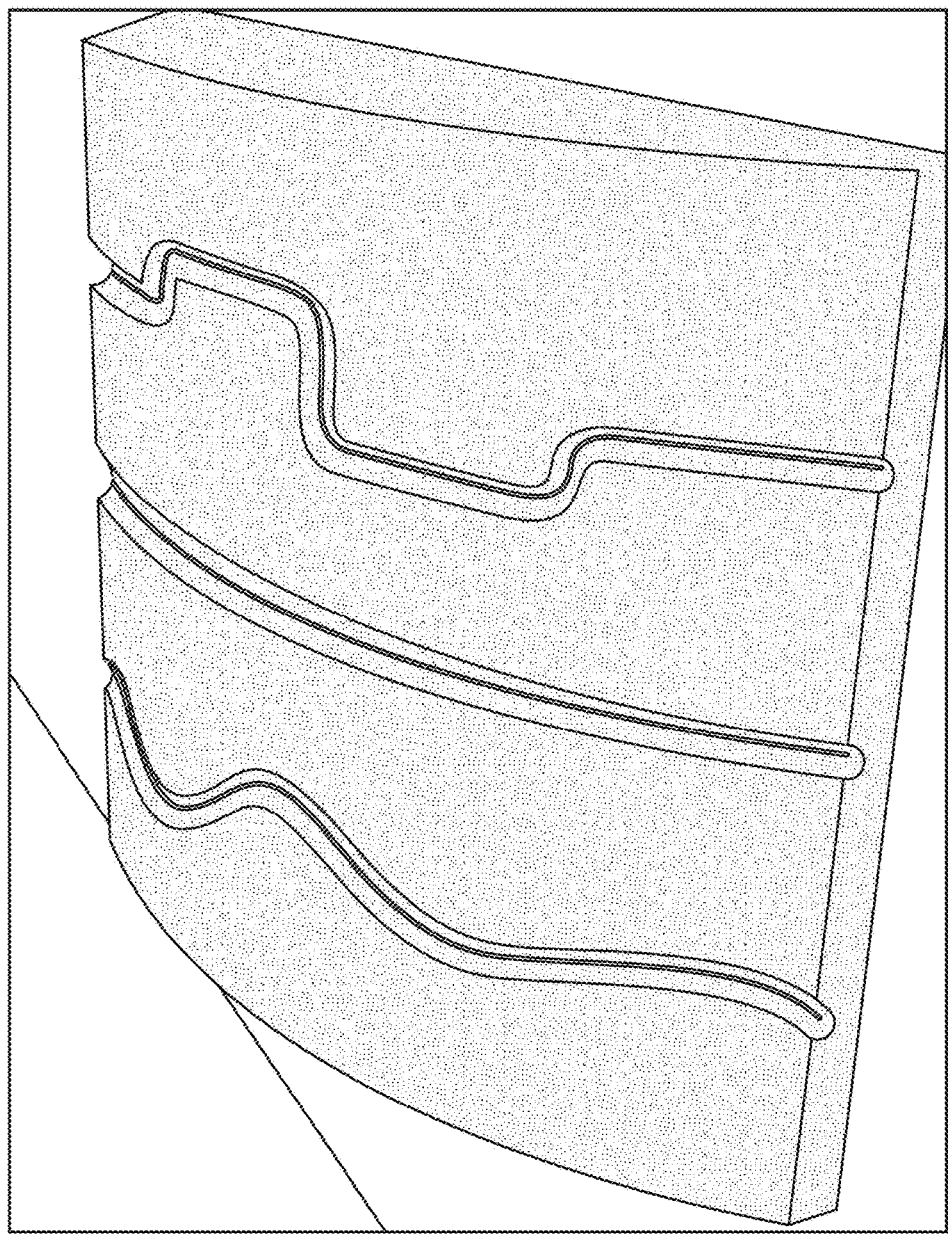
FIG. 11 is a diagram showing aspects of a weld path generation robotic method, according to an embodiment of the present disclosure.

Referring again to FIG. 10, an example of the branch removal process is provided. In this case, branch nodes are color coded as blue, which indicates that this pixel has more than two neighbors. Branch pixels are color coded as green and will be removed. Finally, the path created on the height field may be converted back to the 3D space and displayed side by side with the original point cloud as shown in FIG. 11.

Figure 12:
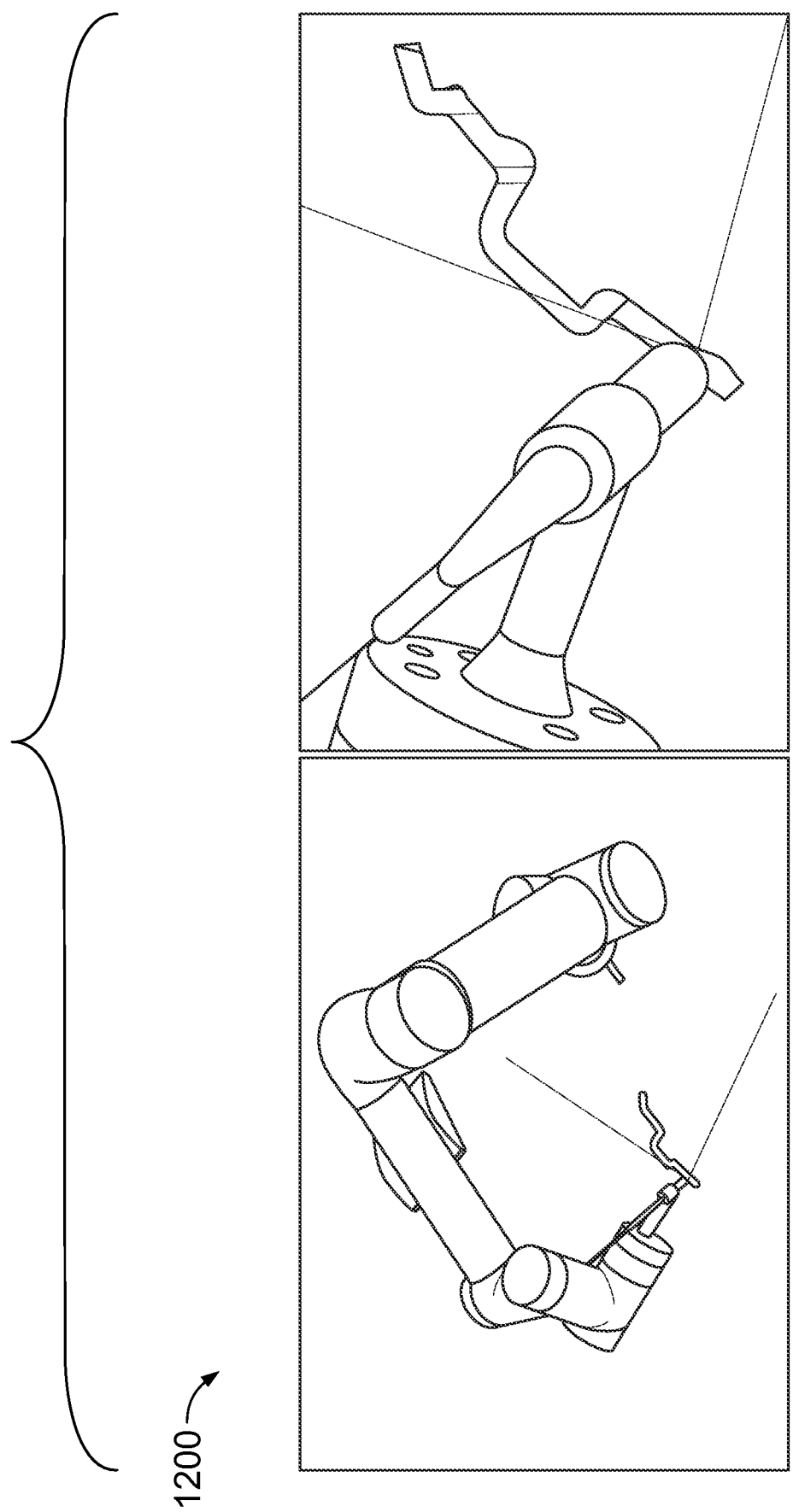
FIG. 12 is a diagram showing aspects of a weld path generation robotic method, according to an embodiment of the present disclosure.
Figure 13:
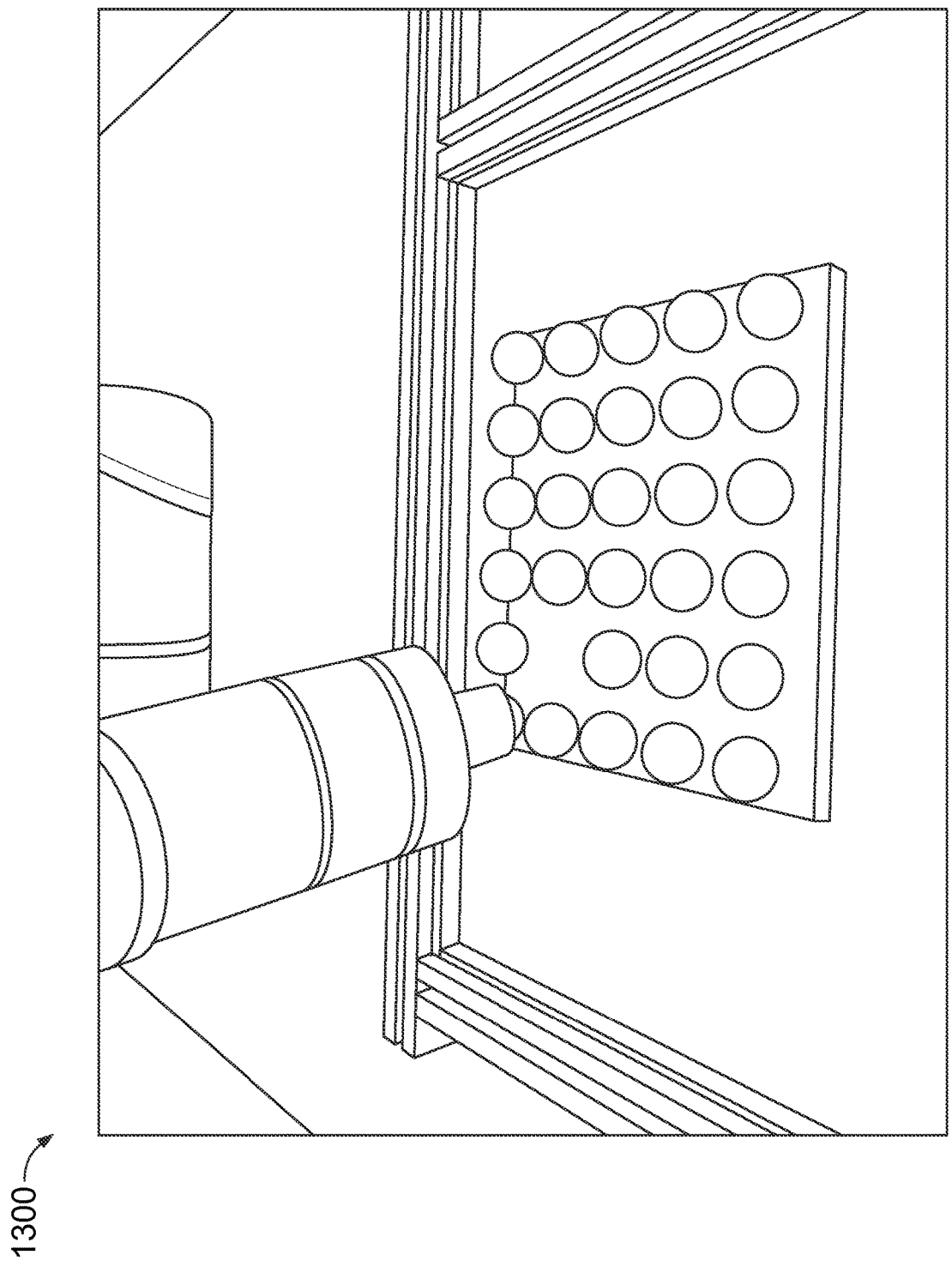
FIG. 13 is a diagram showing aspects of a weld path generation robotic method, according to an embodiment of the present disclosure.
Figure 14:
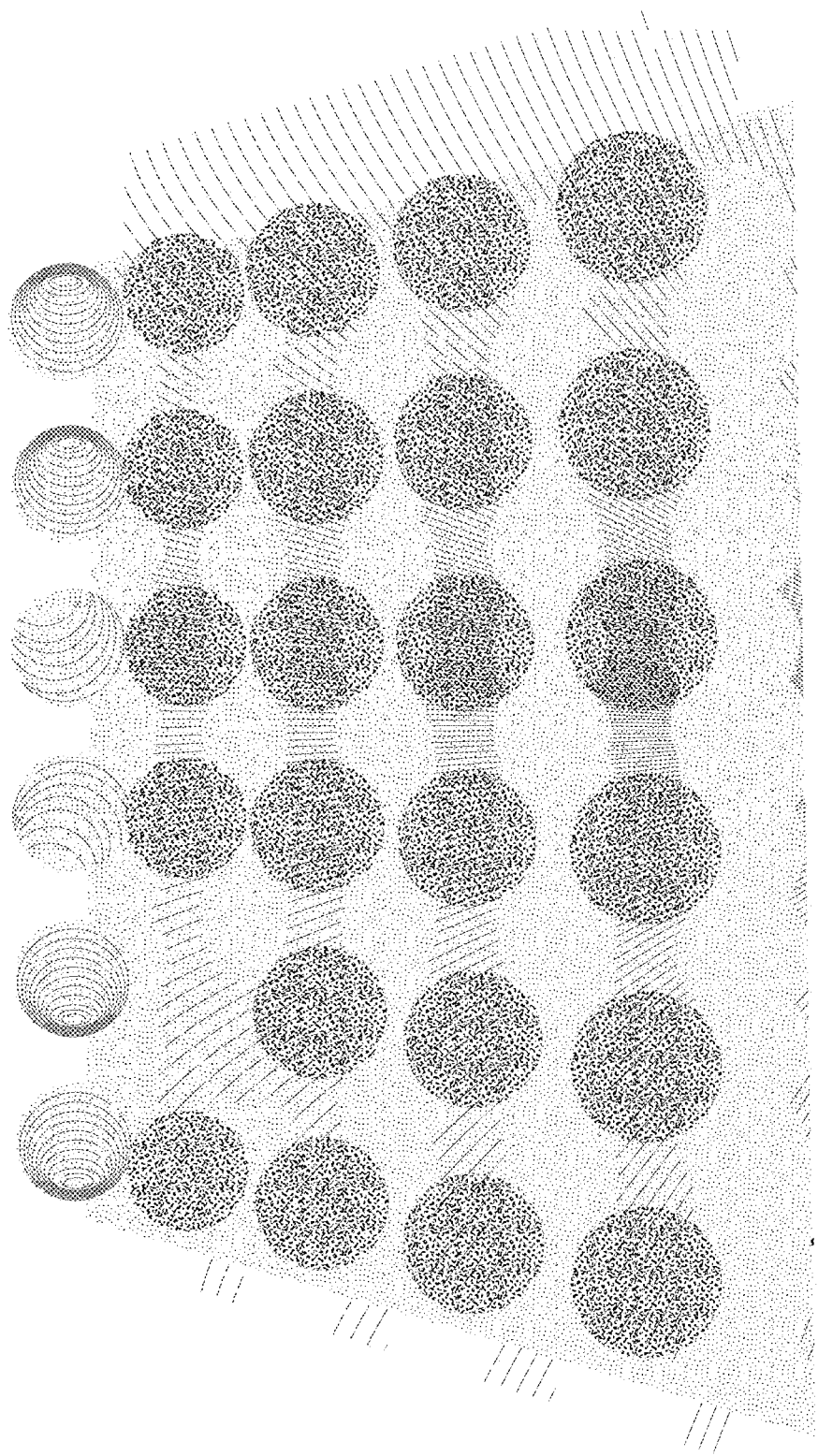
FIG. 14 is a diagram showing aspects of a weld path generation robotic method, according to an embodiment of the present disclosure.
Figure 15:
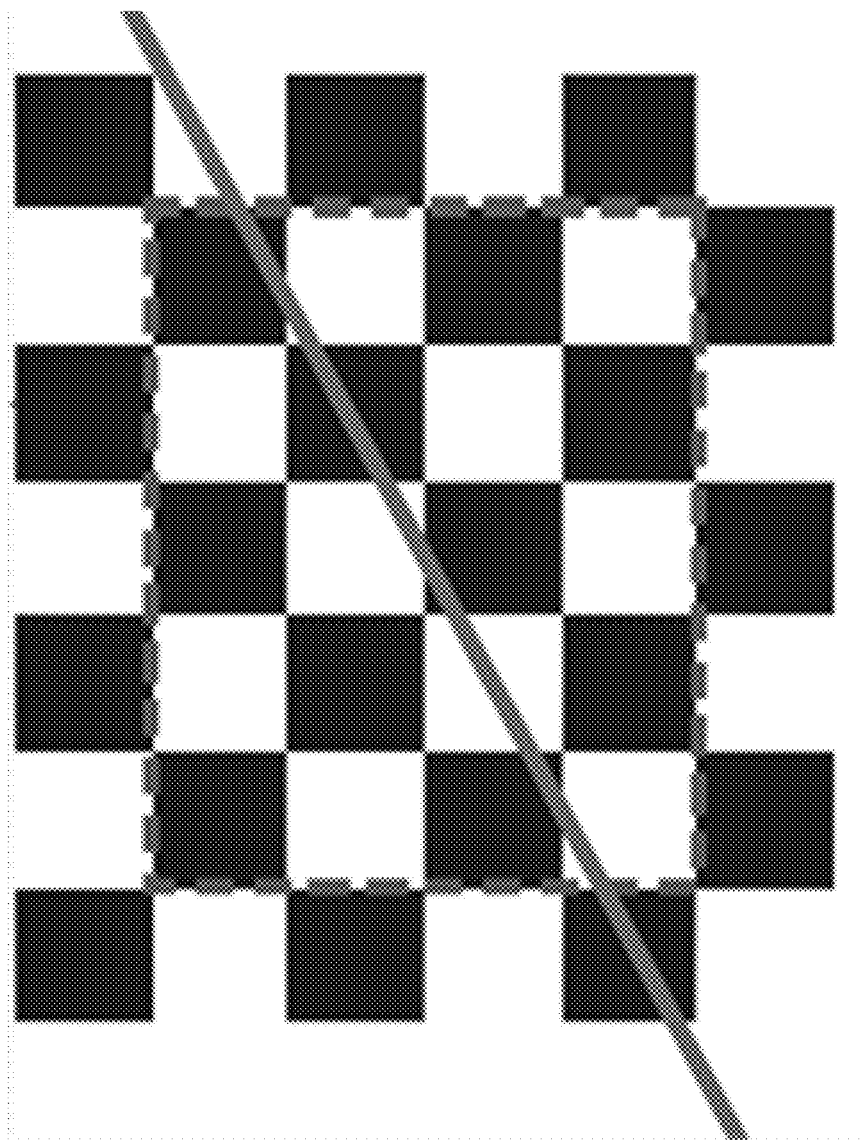
FIG. 15 is a diagram showing aspects of a weld path generation robotic method, according to an embodiment of the present disclosure.

In some embodiments, after the branch removal process, each image block may now have exactly two leaf nodes and no branch node. It is possible to connect the pixels in the block from one leaf nodes to the other without any ambiguity. Additional information such as the normal direction of the weld as well as the tangential direction of the path may be needed for orienting the weld head. In some cases it may be desirable to position the weld head normal to the surface and aligned with the tangential direction of the path. The tangential direction may be calculated as $$v_t(p_i) = \frac{(p_{i+k} - p_{i-k})}{|(p_{i+k} - p_{i-k})|} \quad (1)$$

Where $p_i$ is the i-th point of the path. The filter size k helps to smooth the otherwise noisy tangent calculation. The normal vector may then be calculated as $$\vec{v}_n(p_i) = v_{up} - (v_{up} \cdot v_t(p_i))v_t(p_i) \quad (2)$$

$$v_n = \frac{\vec{v}_n(p_i)}{|\vec{v}_n(p_i)|}$$

Where $v_{up}$ is the up direction unit vector. FIG. 12 shows an example of a conversion from three dimensional points to the path. Normal and tangential information may be added for orientation of the weld head. In this example of the converted path, blue indicates the normal and red indicating the tangent.

Figure 16:
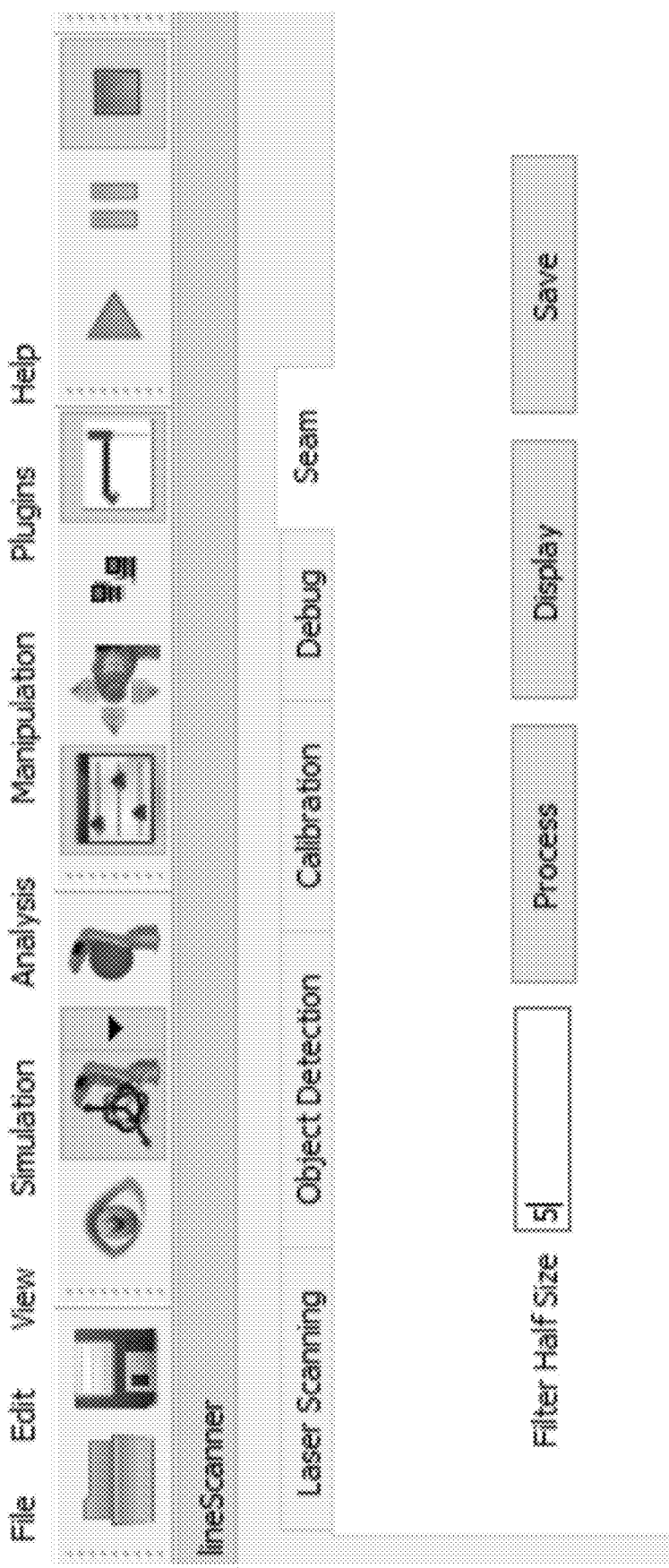
FIG. 16 is a graphical user interface of a weld path generation system, according to an embodiment of the present disclosure.

In some embodiments, weld path generation process may utilize one or more graphical user interfaces to allow for user control of the process. For example, if jitter is identified in the weld path, the process may allow for the application of a moving average filter and corresponding graphical user interface for smoothing the path. By applying a moving average filter of size 7, it can be seen that the path was a lot smoother after filtering. In the example shown in FIG. 16, a user may specify the filter size, start processing the point cloud, display the result, then save the path to a file.

In some embodiments, weld path generation process may be configured to use one or more extra degrees of freedom to help control the weld pool formation relative to the gravity. In this, the focus is on the parts being hold by the robot. For example, one robot/mechanism may be configured to hold the weld head while another holds the part. Accordingly, the combined motion may allow for the weld head to move along the weld path and/or maintain the weld pool formation against the direction of the gravity.

It should be noted that although many of the embodiments included herein are directed towards generating the weld path, with data obtained from scanning prior to the welding other operations are also possible without departing from the scope of the present disclosure. For example, the extra degrees of freedom for helping against gravity may be used during the welding process. In some embodiments, this may be determined during the planning, for example, before the welding as well. Accordingly, embodiments of weld path generation process may use one or more processors to maintain a welding formation with respect to gravity as a welding process is being performed. Maintaining the welding formation may be based upon, at least in part, one or more extra degrees of freedom associated with the robot.

Additionally and/or alternatively, additional sensors and a laser scanner used for visual serving (e.g., fine turning the path in anticipating that the path can deviate from the planned path due to environment changes) may be used as well.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a circuit," "module" or "system." Furthermore, aspects of the present disclosure may take the orm of a computer program product embodied in one or more computer readable medium(s) aving computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave.

Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may, but not always, represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A system comprising:
   a robot;
   one or more three dimensional sensor devices associated with the robot configured to scan a welding area and generate a scanned welding area; and
   one or more processors configured to receive the scanned welding area and to generate a three dimensional point cloud based upon, at least in part the scanned welding area, the one or more processors further configured to perform processing on the three dimensional point cloud in a two-dimensional domain, wherein performing processing on the three dimensional point cloud in a two-dimensional domain includes converting the three dimensional point cloud to a height field and subsequently applying a local minimum filter, the one or more processors further configured to perform image thinning and branch removal prior to converting the height field back to a three dimensional space, the one or more processors further configured to utilize the converted height field to generate one or more three dimensional welding paths and to simulate the one or more three dimensional welding paths, wherein the one or more processors are communicatively coupled to a graphical user interface configured to allow a user to select a filter size, select a point cloud for processing, visualize a weld path result or save the one or more three-dimensional welding paths.

2. The system of claim 1, wherein processing the three-dimensional point cloud in a two-dimensional domain includes at least one of binary image thinning of a welding path or smoothing a welding path based upon, at least in part, a moving average filter.

3. The system of claim 1, wherein processing the three-dimensional point cloud in a two-dimensional domain includes analysis of one or more environmental or robot constraints.

4. The system of claim 1, wherein simulating the one or more three dimensional welding paths includes verifying feasibility of the one or more three dimensional welding paths.

5. The system of claim 4, wherein if the one or more three dimensional welding paths are not verified, the one or more processors further configured to re-simulate after altering a position of a welding table.

6. The system of claim 2, wherein binary image thinning includes removing one or more branch nodes, wherein a branch node corresponds to a pixel having more than two neighbors.

7. The system of claim 1, wherein the one or more processors are configured to use one or more extra degrees of freedom to maintain a welding formation with respect to gravity as a welding process is being performed.

8. A method comprising:
providing a robot;
scanning a welding area using one or more three dimensional sensor devices associated with the robot to generate a scanned welding area;
receiving the scanned welding area at one or more processors;
generating a three dimensional point cloud based upon, at least in part the scanned welding area;
processing the three dimensional point cloud in a two-dimensional domain to generate one or more three dimensional welding paths, wherein performing processing on the three dimensional point cloud in a two-dimensional domain includes converting the three dimensional point cloud to a height field and subsequently applying a local minimum filter;
performing image thinning and branch removal prior to converting the height field back to a three dimensional space;
generating one or more three dimensional welding paths based upon, the converted height field, wherein the one or more processors are communicatively coupled to a graphical user interface configured to allow a user to select a filter size, select a point cloud for processing, visualize a weld path result or save the one or more three-dimensional welding paths; and
simulating the one or more three dimensional welding paths.

9. The method of claim 8, wherein processing the three-dimensional point cloud in a two-dimensional domain includes at least one of binary image thinning of a welding path or smoothing a welding path based upon, at least in part, a moving average filter.

10. The method of claim 8, wherein processing the three-dimensional point cloud in a two-dimensional domain includes analysis of one or more environmental or robot constraints.

11. The method of claim 8, wherein simulating the one or more three dimensional welding paths includes verifying feasibility of the one or more three dimensional welding paths.

12. The method of claim 11, wherein if the one or more three dimensional welding paths are not verified, the one or more processors further configured to re-simulate after altering a position of a welding table.

13. The method of claim 9, wherein binary image thinning includes removing one or more branch nodes, wherein a branch node corresponds to a pixel having more than two neighbors.

14. The method of claim 8, further comprising:
using one or more processors to maintain a welding formation with respect to gravity as a welding process is being performed wherein maintaining the welding formation is based upon, at least in part, one or more extra degrees of freedom associated with the robot.

* * * * *